Dec. 26, 1933.   W. A. McLEAN   1,941,311
OIL FILTER
Filed July 10, 1931
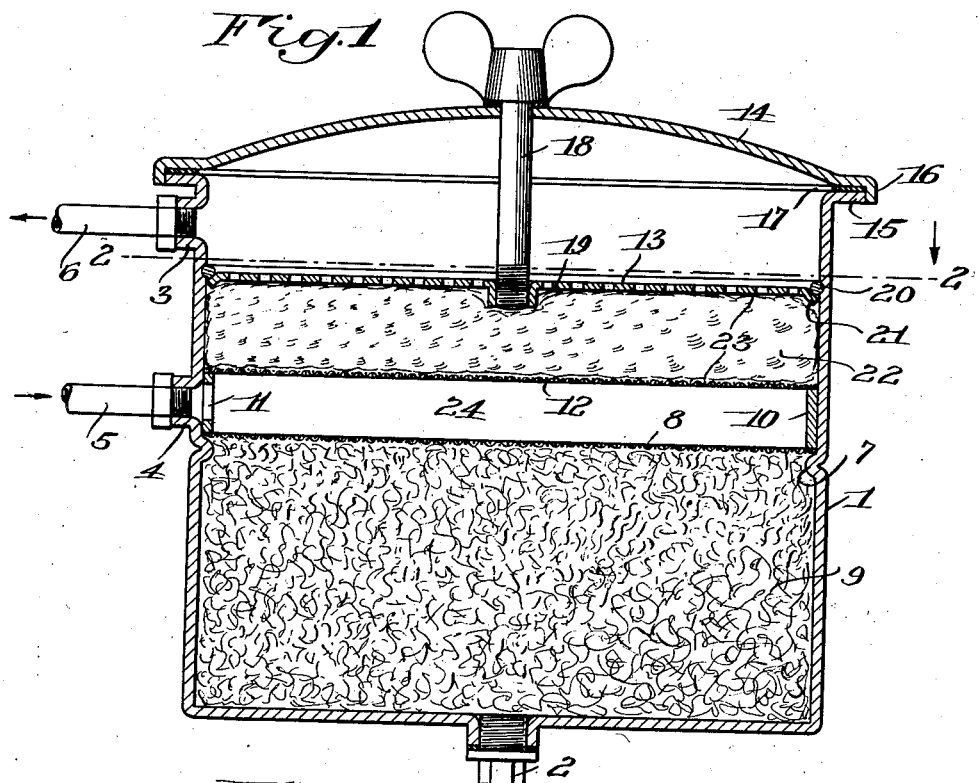
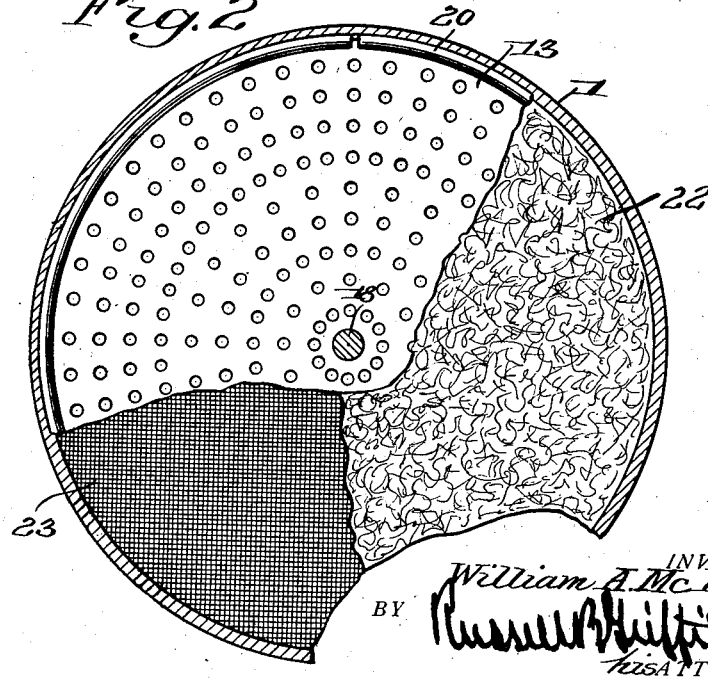

Patented Dec. 26, 1933

1,941,311

UNITED STATES PATENT OFFICE 1,941,311

OIL FILTER

William A. McLean, Rochester, N. Y., assignor to C. Schnackel's Sons, Inc., Rochester, N. Y., a corporation of New York Application July 10, 1931. Serial No. 549,963

7 Claims. (Cl. 210—164)

My present invention relates to filters and more particularly to liquid filters, and it has for its object to provide a device of this character that will be simple in construction, inexpensive to manufacture, comprising few parts, easily assembled and highly efficient in use. The invention is applicable to lubricating oil systems such as are used in internal combustion and other engines, and the improvements are directed in part toward providing a novel means for trapping the larger impurities or solid substances in the oil through one instrumentality and then further filtering the oil for the finer impurities by means of another instrumentality. They are also directed toward rendering both of these filtering mediums renewable and readily accessible for such purposes and toward providing a general construction contributing to these ends.

To these and other ends, the invention resides in certain improvements and combinations of parts, all as will be hereinafter more fully described, the novel features being pointed out in the claims at the end of the specification.

In the drawing:

Fig. 1 is a central vertical section through a filter constructed in accordance with and illustrating one embodiment of my invention, and Fig. 2 is a horizontal section therethrough taken on the line 2—2 of Fig. 1 and looking in the direction of the arrow.

Similar reference numerals throughout the several views indicate the same parts.

As before stated, my invention is particularly applicable to oil filters for lubricating systems, and I have shown it and will describe it in such a connection.

It may be placed at any point in the lubricating system, preferably adjacent to the intake of the circulating pump. In the present embodiment, it consists of a main body or tank 1 having a drain plug 2 at the bottom, an outlet 3 near the top and an inlet 4 in the side wall at an intermediate point. These elements 3 and 4 preferably consist of nipples or internally threaded collars stamped out from the material of the tank for the pipe connections 5 and 6 leading respectively from the pump or other source of impure oil suppply and to the bearings or other point where the filtered oil is to be used.

At an intermediate point below the intake 4, the tank 1 is provided with an internal shoulder 7 which may be formed by stamping or spinning in the sheet material thereof, and upon this rests a circular gauze screen 8 that confines a body of filtering material 9 occupying the bottom of the tank, the nature and function of which body will be later explained. Resting on the screen 8 and on the shoulder 7 through the medium of the screen is a spacing ring 10 which is in of the general plane of the intake opening 4 and is provided opposite the latter with an opening 11 to admit the flow of oil from the pipe 5 into a cylindrical central chamber 24, the lower wall of which is constituted by the screen 8 and the upper wall by a similar screen 12 resting upon the top of spacing ring 10.

Spaced above screen 12 is a foraminous plate 13, the openings in which are relatively large to allow a free passage of oil under pressure. A removable cover 14 rests upon an outwardly turned flange or bead 15 on the upper rim of the tank, making tight connection therewith through a cooperating downwardly turned flange 16 on the said cover and an interposed gasket 17. A wing bolt 18 extending centrally through the cover is threaded into a collar 19 formed in the center of the foraminous plate 13. Through tightening this bolt, the cover 14 is drawn down securely and the upward pulling reaction on the plate 13 is met by a locking ring 20 having a semi-cylindrical seat in the inner face of the wall of the tank. The rim of the plate 13 is struck down angularly at 21 to engage the locking ring with a wedging action that tends to force it into its seat rather than to dislodge it. Upon removal of the cover and ring, the bolt may be screwed back into the plate for convenience in removing it and cleaning it.

The space between screen 12 and plate 13 forms a chamber in which is placed a relatively fine filtering medium 22, such as cotton batting. It is in the form of a disk, is removable to be replaced with a fresh filter, and is preferably faced on top and bottom, as indicated at 23, with cotton gauze or sheeting or other textile to prevent the cotton particles from lodging in and clogging the screens that confine it and also forming in themselves an intermediate filter of a coarseness between that of the plate and that of the cotton or other interior. The element 22 as a whole thus constitutes a removable and replaceable or renewable cartridge that may be separately sold to users of the filter for restoring its efficiency from time to time.

In the operation of the device, the oil is pumped in at 4, under pressure, to the central chamber 24. Extremely large impurities in solid form will be caught on the screen 8. The oil with the less coarse impurities is free to percolate the screen 8 into and through the body 9, which I have called a filtering material, but which constitutes an interstitial mass, the real function of which is to create a sluggish body of oil. A suitable material to be here employed is a sponge-like body of metal, such as tinsel, copper wool or steel wool. The solid impurities gravitate through this adhering to the metallic shreds by which they are trapped and prevented from rejoining the circulatory stream. Obviously, this happens during periods in which the engine is at rest but also when the pump is going there is little agitation in parts of the chamber 24 permitting this filtering to progress constantly.

From chamber 24, the pressure forces the oil upwardly through screen 12 and the fine filter 22, whereafter, in cleansed condition, it passes through the foraminous plate 13 and out at the discharge nipple 3.

It is obvious that all of the enclosed parts may be progressively removed from the top of the tank after the loosening of the bolt 18 and the removal of the cover 14. The locking ring 20 is contracted to release plate 13, which gives access to the filtering medium 22 for replacement, or the screen 12, ring 10 and screen 8 may also be removed in the order named to replace the body of tinsel 9 with a fresh body. Before renewing these perishable parts, the tank is easily thoroughly cleaned and drained through the plug 2.

I claim as my invention:

1. In an oil filter or the like, the combination with a tank having an upper discharge connection and a lower intake connection, of interstitial means embodying a bulky tangled mass located in the bottom of the tank below the intake connection adapted to be submerged in the body of oil and permit only a sluggish movement thereof while solid particles of impurities adhere thereto or are permitted to gravitate therethrough.

2. In an oil filter or the like, the combination with a tank having an upper discharge connection and a lower intake connection, of interstitial means located in the bottom of the tank below the intake connection adapted to be submerged in the body of oil and permit only a sluggish movement thereof while solid particles of impurities are permitted to gravitate therethrough, said means embodying a body of metallic wool.

3. In an oil filter or the like, the combination with a tank having a central chamber and an inlet connection communicating therewith, of interstitial means located in the bottom of the tank below the chamber consisting of an absorbent body adapted to be submerged in the body of oil and permit only a sluggish movement thereof while solid particles of impurities are entangled therein, a filtering medium above the chamber, and an outlet connection on the tank above the filtering medium.

4. In an oil filter or the like, the combination with a tank having an upper discharge connection and a lower intake connection, of a filtering medium in the tank between the two consisting of a batting of fibrous material having textile facings, a pair of oil permeable supports for the batting removably secured within the tank, means for releasably locking the upper support to the walls of the tank, a displaceable cover for the tank, and a clamping means for the latter threaded into one of the supports and by means of which the latter can be removed from the tank or the clamping means unscrewed from the support for independent removal of the cover.

5. In an oil filter or the like, the combination with a tank having an upper discharge connection and a lower intake connection and provided with a shoulder below the latter, of interstitial means located in the bottom of the tank below the intake connection adapted to be submerged in the body of oil and permit only a sluggish movement thereof while solid particles of impurities are permitted to gravitate therethrough, and an oil permeable confining element for the latter supported on the shoulder.

6. In an oil filter or the like, the combination with a tank having an upper discharge connection and a lower intake connection and provided with a shoulder below the latter, of interstitial means located in the bottom of the tank below the intake connection adapted to be submerged in the body of oil and permit only a sluggish movement thereof while solid particles of impurities are permitted to gravitate therethrough, an oil permeable confining element for the latter supported on the shoulder, a spacing ring resting on said confining element to form a chamber, and a filtering unit resting on the spacing ring between the two connections.

7. In an oil filter or the like, the combination with a tank having an upper discharge connection and a lower intake connection and provided with a shoulder below the latter, of interstitial means located in the bottom of the tank below the intake connection adapted to be submerged in the body of oil and permit only a sluggish movement thereof while solid particles of impurities are permitted to gravitate therethrough, an oil permeable confining element for the latter supported on the shoulder, a spacing ring resting on said confining element to form a chamber, a filtering unit resting on the spacing ring between the two connections and embodying an upper foraminous plate, means for locking the latter to the tank wall, a displaceable cover for the tank, and a clamping device for the cover cooperating with and reacting against the foraminous plate.

WILLIAM A. McLEAN.